US011942697B2

(12) United States Patent
Wu

(10) Patent No.: US 11,942,697 B2
(45) Date of Patent: Mar. 26, 2024

(54) PHASE CONTROL DEVICE, ANTENNA SYSTEM, AND METHOD OF CONTROLLING PHASE OF ELECTROMAGNETIC WAVE

(71) Applicant: NEC Corporation, Tokyo (JP)

(72) Inventor: Mingqi Wu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 199 days.

(21) Appl. No.: 17/421,342

(22) PCT Filed: Jan. 15, 2019

(86) PCT No.: PCT/JP2019/000962
§ 371 (c)(1),
(2) Date: Jul. 7, 2021

(87) PCT Pub. No.: WO2020/148809
PCT Pub. Date: Jul. 23, 2020

(65) Prior Publication Data
US 2022/0085499 A1 Mar. 17, 2022

(51) Int. Cl.
*H01Q 15/02* (2006.01)
*H01Q 3/46* (2006.01)

(52) U.S. Cl.
CPC .................................... *H01Q 3/46* (2013.01)

(58) Field of Classification Search
CPC ....... H01Q 3/46; H01Q 15/0086; H01Q 15/02
See application file for complete search history.

(56) References Cited

U.S. PATENT DOCUMENTS

| | | | | |
|---|---|---|---|---|
| 2010/0220035 | A1 | 9/2010 | Lee et al. | |
| 2011/0148704 | A1 | 6/2011 | Kim | |
| 2013/0271346 | A1 | 10/2013 | Dussopt et al. | |
| 2015/0303584 | A1 | 10/2015 | Liu et al. | |
| 2019/0260135 | A1 * | 8/2019 | Kasahara | H01Q 13/10 |

FOREIGN PATENT DOCUMENTS

| | | | |
|---|---|---|---|
| CN | 105161858 | A | 12/2015 |
| EP | 2738874 | A1 | 6/2014 |
| JP | H036683 | A | 1/1991 |
| JP | 2015231184 | A | 12/2015 |

OTHER PUBLICATIONS

International Search Report for PCT Application No. PCT/JP2019/000962, dated Apr. 2, 2019.

Huang et al., "Asymmetric Transmission for Linearly Polarized Wave through Tunable Chiral Metasurface", 2018 Cross Strait Quad-Regional Radio Science and Wireless Technology Conference (CSORWC) [online], Jul. 24, 2018, pp. 1-3, [retrieved on Mar. 19, 2019] https://ieeexplore.ieee.org/document/8455259.

* cited by examiner

*Primary Examiner* — Awat M Salih
(74) *Attorney, Agent, or Firm* — Sughrue Mion, PLLC

(57) ABSTRACT

An object is to actively control a phase of electromagnetic wave with high efficiency. A phase control device includes a phase control lens and a control circuit. The phase control lens includes metamaterial boards arranged in a first direction and separated from each other. Each metamaterial board shifts a phase of electromagnetic wave passing therethrough. The control circuit controls admittance distribution in a plane perpendicular to the first direction of each metamaterial board.

6 Claims, 12 Drawing Sheets

$$\begin{pmatrix} A & B \\ C & D \end{pmatrix} = \begin{pmatrix} 1 & 0 \\ Y_1 & 1 \end{pmatrix} \begin{pmatrix} \cos(h\beta_1) & j \\ \eta_1 & \cos(h\beta_1) \end{pmatrix} \begin{pmatrix} 1 & 0 \\ Y_2 & 1 \end{pmatrix} \begin{pmatrix} \cos(h\beta_2) & j \\ \eta_2 & \cos(h\beta_2) \end{pmatrix} \cdots \begin{pmatrix} \cos(h\beta_{n-1}) & j \\ \eta_{n-1} & \cos(h\beta_{n-1}) \end{pmatrix} \begin{pmatrix} 1 & 0 \\ Y_n & 1 \end{pmatrix}$$

Fig. 7

PHASE CONTROL DEVICE, ANTENNA SYSTEM, AND METHOD OF CONTROLLING PHASE OF ELECTROMAGNETIC WAVE

This application is a National Stage Entry of PCT/JP2019/000962 filed on Jan. 15, 2019, the contents of all of which are incorporated herein by reference, in their entirety.

TECHNICAL FIELD

The present invention relates to a phase control device, an antenna system, and a method of controlling a phase of electromagnetic wave.

BACKGROUND ART

One of radiating cells having two phase states used for a transmitting network has been disclosed in Patent Literature 1 (PTL1). The cell includes a first antenna and a second antenna. The first antenna is arranged on one side of an assembly including two substrate layers separated by a ground plane, and the second antenna is arranged on the other side of the assembly. The second antenna includes a conducting element capable of radiating that has two switching states (an on state or an off state) between two ports. The radiating cell applies notably to implementation of transmitter arrays employing several configurable cells to control a radiation pattern.

CITATION LIST

Patent Literature

PTL 1: United States Patent Publication No. 2013/0271346

SUMMARY OF INVENTION

Technical Problem

The radiating cell disclosed in PTL1 capable of transmitting microwave frequency signals can be in the on state or the off state to control the phase states is controlled. The radiating cells disposed in the transmitter array for adjusting the phase state of the signal transmitted to form the radiation pattern has only two phase states in opposition to each other. However, a required phase shift of the signal on the array may be any amounts in a range from 0 to 360 degrees determined by the frequency and a position of the transmitter array. Meanwhile, the provided phase states are limited to only two. As a result, the transmitter array has a relatively large quantization error of phase compensation and, thereby leads to a relatively higher loss.

The present invention has been made in view of the above-mentioned problem, and an objective of the present invention is to actively control a phase of electromagnetic wave with high efficiency.

Solution to Problem

An aspect of the present invention is a phase control device including: a phase control lens including at least two metamaterial boards arranged in a first direction and separated from each other, each metamaterial board shifting a phase of electromagnetic wave passing therethrough; and a control circuit configured to control admittance distribution in a plane perpendicular to the first direction of each metamaterial board.

An aspect of the present invention is an antenna system including: an antenna configured to emit electromagnetic wave; and a phase control device configured to control a phase of the electromagnetic wave, in which the phase control device includes: a phase control lens includes: at least two metamaterial boards arranged in a first direction and separated from each other, each metamaterial board shifting a phase of electromagnetic wave passing therethrough; and a control circuit configured to control admittance distribution in a plane perpendicular to the first direction of each metamaterial board.

An aspect of the present invention is a method of controlling a phase of electromagnetic wave including; emitting electromagnetic wave to a phase control lens, the phase control lens including at least two metamaterial boards arranged in a first direction and separated from each other, each metamaterial board shifting a phase of electromagnetic wave passing therethrough; and controlling admittance distribution in a plane perpendicular to the first direction of each metamaterial board.

Advantageous Effects of Invention

According to the present invention, it is possible to actively control a phase of electromagnetic wave with high efficiency.

BRIEF DESCRIPTION OF DRAWINGS

FIG. 7 illustrates an ABCD-matrix of the basic cube structure illustrated in FIG. 6;

DESCRIPTION OF EMBODIMENTS

Figure 1:
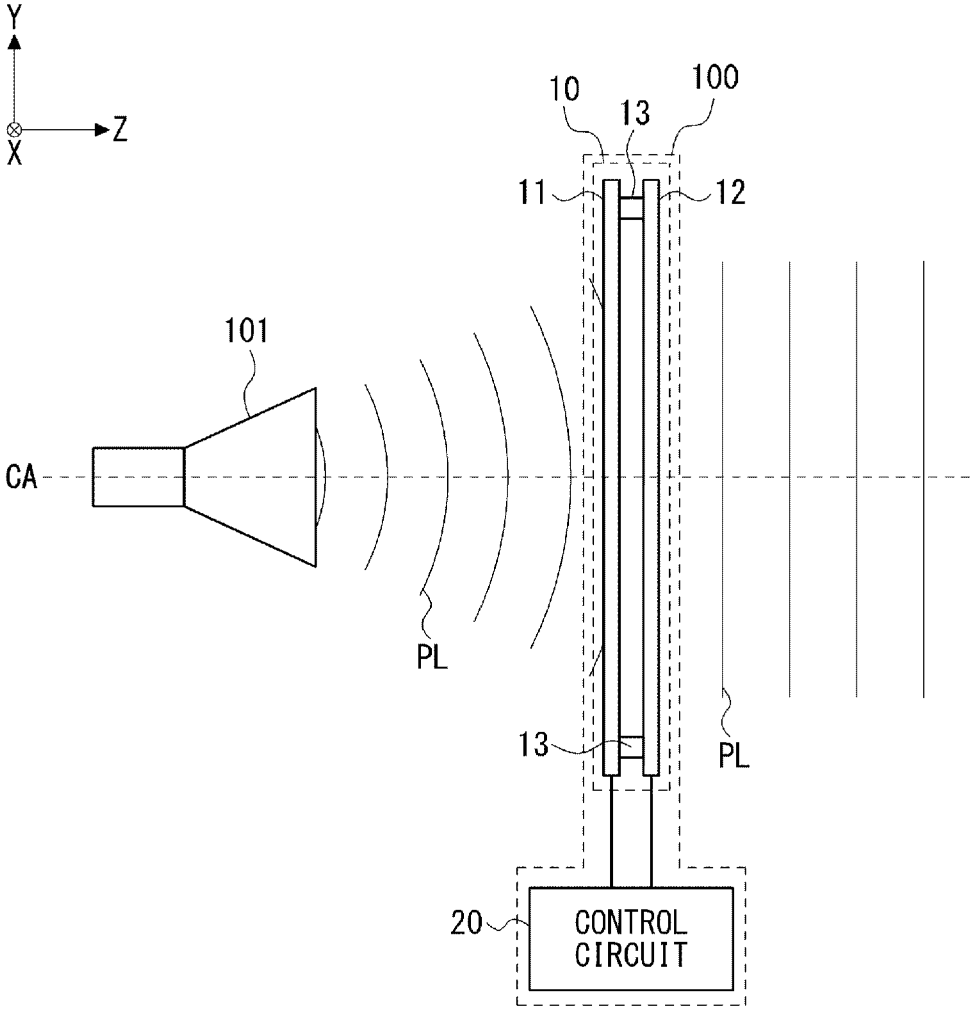
FIG. 1 schematically illustrates a phase control device according to a first exemplary embodiment.

Exemplary embodiments of the present invention will be described below with reference to the drawings. In the drawings, the same elements are denoted by the same reference numerals, and thus a repeated description is omitted as needed.

First Exemplary Embodiment

A phase control device according to a first exemplary embodiment will be described. FIG. 1 schematically illustrates a phase control device 100 according to the first exemplary embodiment. The phase control device 100 includes a phase control lens 10 and a control circuit 20. The phase control lens 10 includes two metamaterial boards 11 and 12. The metamaterial boards 11 and 12 are configured to have a so-called metasurface.

A principal surface of each of the metamaterial boards 11 and 12 is parallel to the X-Y plane in FIG. 1. The X-axis extends along a direction normal to a plane of FIG. 1 or a direction from the front to the back of FIG. 1. The Y-axis is perpendicular to the X-axis and extends along the horizontal (or lateral) direction of FIG. 1. The Z-axis is perpendicular to the X-axis and the Y-axis and extends along the vertical (or longitudinal) direction of FIG. 1.

Thus, a center axis of the metamaterial board 11 and a center axis of the metamaterial board 12 are parallel to the Z-axis direction in FIG. 1. The metamaterial boards 11 and 12 are arranged in series in the Z-axis direction in such a manner that the axes of metamaterial boards 11 and 12 are aligned with the central axis CA. Further, as illustrated in FIG. 1, the metamaterial boards 11 and 12 are stacked along the Z-axis direction to be separated from each other by air spacers 13.

The phase control device 100 is configured to control a phase of electromagnetic wave emitted from an antenna 101 in the Z-axis direction while the electromagnetic wave passes through the phase control lens 10. As illustrated in FIG. 1, one surface of the phase control device 10, i.e. a surface 11A of the metamaterial board 11, faces the antenna 101. The phase control device 100 and the antenna 101 constitute an antenna system.

When the antenna 101 is not a directional antenna, the antenna 101 isotropically emits the electromagnetic wave. Various types of antennas such as a horn antenna, a dipole antenna, and a patch antenna can be used as the antenna 101. Therefore, when the electromagnetic wave reaches the surface 11A of the phase control lens 10 facing the antenna 101, the phase of the electromagnetic wave is not uniform on this surface of the phase control device 100. In FIG. 1, a plane and a rounded surface on which the phase of the electromagnetic wave is equal are represented by lines PL.

Figure 2:
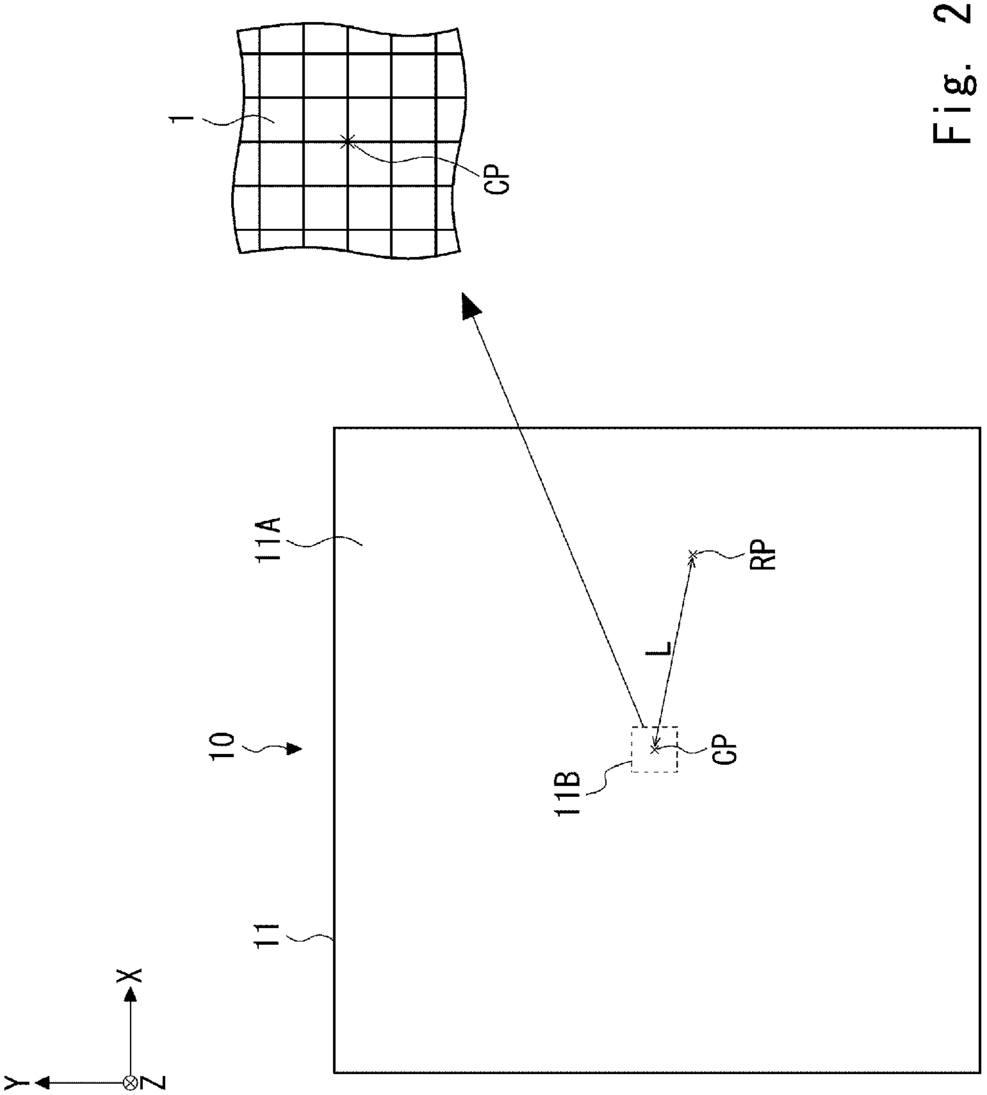
FIG. 2 schematically illustrates a phase control lens viewed from an antenna along a Z-axis direction.

FIG. 2 schematically illustrates the phase control lens 10 viewed from the antenna 101 along the Z-axis direction. As illustrated in FIG. 2, on the surface 11A of the metamaterial board 11 facing the antenna 101, the farther from the center point CP, the more the phase of the electromagnetic wave delays. In FIG. 2, a part 11B of the surface 11A is expanded and illustrated for convenience.

As illustrated in FIG. 1, the phase control lens 10 includes two metamaterial boards 11 and 12. Each of the metamaterial boards 11 and 12 provides a half of the phase shift from 0 to 360 degrees. It is easier to design a metamaterial board capable of covering the half of the 360-degree phase shift (also referred to as a half range) than to design a metamaterial board covering the all of the 360-degree phase shift (also referred to as a full range). Since the coverage of the phase shift due to one metamaterial board can be decreased from the full range (360 degrees) to the half range (180 degrees), a critical resonant condition of each metamaterial board can be avoided so that a wider bandwidth can be achieved. Since the metamaterial board 11 and 12 are arranged in series along the center axis CA, the phase control lens 10 can provide any phase shift amount from 0 to 360 degrees by summing up the phase shifts of the metamaterial boards 11 and 12.

Note that the metamaterial boards 11 and 12 may be arranged to be mirror symmetric with respect to the X-Y plane so as to reduce a coupling micro current caused by the electromagnetic field.

Thus, in the present exemplary embodiment, the phase control device 100 controls the phase of the electromagnetic wave to emit the electromagnetic wave having the phase plane PL perpendicular to the transmission direction (the Z-axis direction). In other words, the phase plane PL is parallel to the X-Y plane perpendicular to the Z-axis direction.

Note that the number of serially arranged metamaterial boards of the phase control lens may not be limited to two and may be three or more. Thus, the phase shift coverage of each metamaterial board is not limited to the half range (0 to 180 degrees). The phase shift coverage of each metamaterial board may cover any phase shift range within the full range (0 to 360 degrees) as long as the phase control lens can cover the full phase shift range from 0 to 360 degrees. For example, when the phase control lens includes N metamaterial boards, the coverage of the phase shift of each metamaterial board may be a range from 0 to 360/N degrees, where N is an integer more than two.

Figure 3:
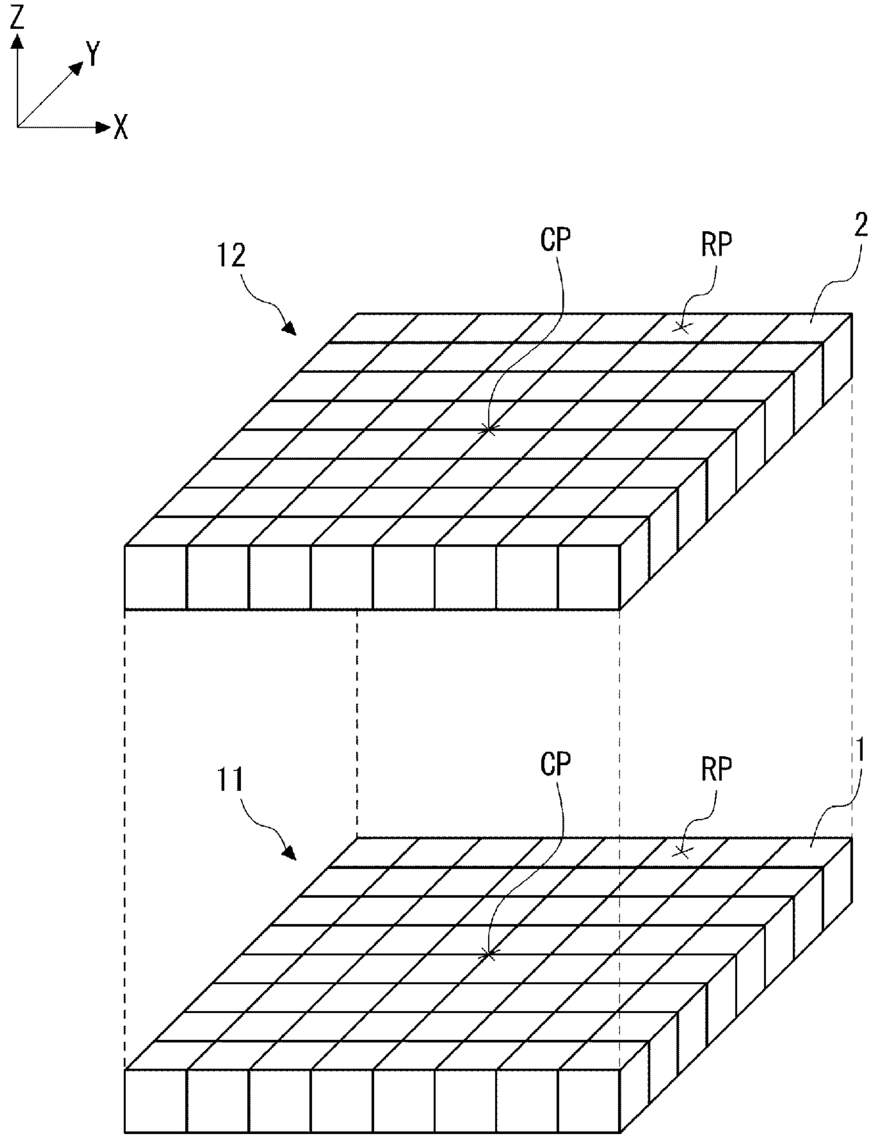
FIG. 3 schematically illustrates a part of metamaterial boards.

FIG. 3 schematically illustrates a part of the metamaterial boards 11 and 12. The metamaterial boards 11 and 13 include a plurality of three-dimensional units. In the present exemplary embodiment, a cube unit is used as the three-dimensional unit.

The metamaterial board 11 includes a plurality of cube units 1. The cube units 1 are arranged in a matrix manner in the X-Y plane. In other words, the cube units 1 are arranged to constitute a two-dimensional array of cube units.

The metamaterial board 12 has a configuration similar to that of the metamaterial board 11. The metamaterial board 12 includes a plurality of cube units 2 that correspond to the cube units 1 of the metamaterial board 11. The cube units 2 are arranged in a matrix manner in the X-Y plane. In other words, the cube units 2 are arranged to constitute a two-dimensional array of cube units.

Figure 4:
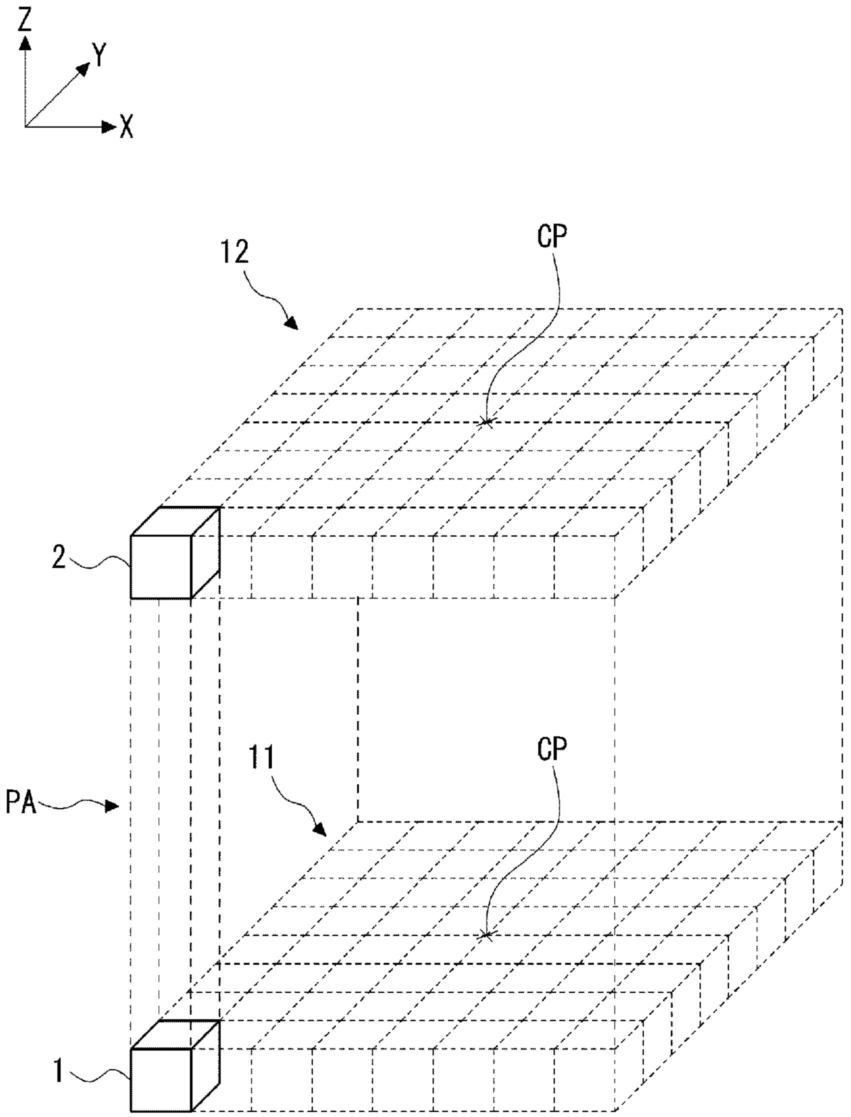
FIG. 4 schematically illustrates a cube unit pair including two cube units that are arranged in the Z-axis direction.

As illustrated in FIG. 3, all of the cube units 1 and 2 have the same structure. Further, in the present configuration, one cube unit 1 and one corresponding cube unit 2 are arranged in the Z-axis direction and constitute a cube unit pair PA. FIG. 4 schematically illustrates the cube unit pair PA including one cube unit 1 and one corresponding cube unit 2 that are arranged in the Z-axis direction.

Note that the shape of the three-dimensional unit is not limited to the cube. As long as the three-dimensional units can be densely arranged without any space, other shapes such as a cuboid and a hexagonal column can be adopted as the shape of the three-dimensional unit.

The control circuit 20 can control a state of each cube unit in order to control a phase delay amount provided to the electromagnetic wave by each cube unit. In this case, the state of each cube unit can be switched to a first state or a second state so that the phase delay amount provided to the electromagnetic wave by each cube unit can be changed into a first phase delay amount or a second phase delay amount. The state switching may be realized by active components in each cube unit connected to the control circuit 20. The active component may be a PIN (p-intrinsic-n) diode.

In the present exemplary embodiment, a phase delay amount difference between the first and second states is 90 degrees. Thus, the cube unit pair PA aligned along the Z-axis direction of the phase control lens 10 can be in any one of three equivalent states determined by the control circuit 20 as described below.

First Equivalent State

When both of the cube units 1 and 2 are in the first state, the cube unit pair PA is in a first equivalent state.

Second Equivalent State

When one of the cube units 1 and 2 is in the first state and the other of the cube units 1 and 2 is in the second state, the cube unit pair PA is in a second equivalent state.

Third Equivalent State

When both of the cube units 1 and 2 are in the second state, the cube unit pair PA is in a third equivalent state.

In the present configuration, the control circuit 20 can switch the equivalent state of each cube unit pair PA in the phase control lens 10 among the first to third equivalent states described above. Thus, the phase delay amount difference between the first equivalent state and the second equivalent state is 90 degrees. The phase delay amount difference between the second equivalent state and the third equivalent state is 90 degrees. The phase delay amount difference between the first equivalent state and the third equivalent state is 180 degrees.

In the present configuration, by switching of the equivalent state of each cube unit pair PA, it is possible to reduce a phase delay error caused by the difference between a required phase delay amount determined by calculation and an actual phase delay amount achieved by the cube units that are controlled by the control circuit 20.

Figure 5:
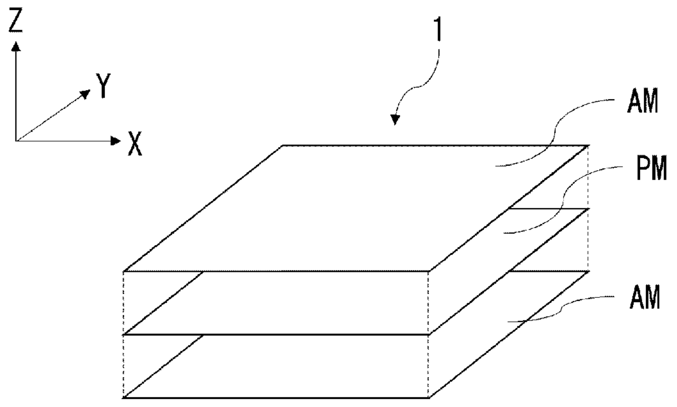
FIG. 5 schematically illustrates an example of a basic cube structure including two active metal layers and one passive metal layer.

A basic cube structure of the cube unit will be described. The cube units 1 and 2 have the same basic cube structure. The basic cube structure includes a plurality of metal layers stacked in the perpendicular direction (the Z-axis direction) to the surface of the phase control device 100 (the X-Y plane). FIG. 5 schematically illustrates an example of the basic cube structure includes two active metal layers AM and one passive metal layer PM.

Each active metal layer AM includes at least one active component and a metal pattern. The active component is an electronic component such as a PIN diode. The state of the active component can be switched between at least two states by the control circuit 20. Thus, the admittance of the active metal layers can be switched into any of two or more values by the control circuit 20. In contrast, the passive metal layer PM includes only one metal pattern. In FIG. 5, the active metal layer AM and the passive metal layer PM have a square shape. The active metal layer AM and passive metal layer PM adjacent to each other are insulated by a dielectric layer. For simplification, the dielectric layer is not illustrated in FIG. 5 and the following drawings. Therefore, the active metal layers, the passive metal layers and the dielectric layers are stacked in the Z-axis direction.

The shape of the active metal layer and the passive metal layer are not limited to the square shape. Another shape such as a rectangle and a round shape can be adopted.

Further, the number of active metal layers, the number of passive metal layers and the number of the dielectric layers are not limited to those in the example of FIG. 5. Thus, the number of the metal layers as a sum of active metal layers and passive metal layers may be any plural number and the number of the dielectric layers may be any number corresponding to the number of the metal layers. Thus, n metal layers M1 to Mn and (n−1) dielectric layers may be alternately stacked in the cube basic structure, where n is an integer equal to or more than two.

The metal layer and the dielectric layer can be formed by various manufacturing method such as vacuum deposition including chemical vapor deposition, plating and spin coating, for example.

Figure 6:
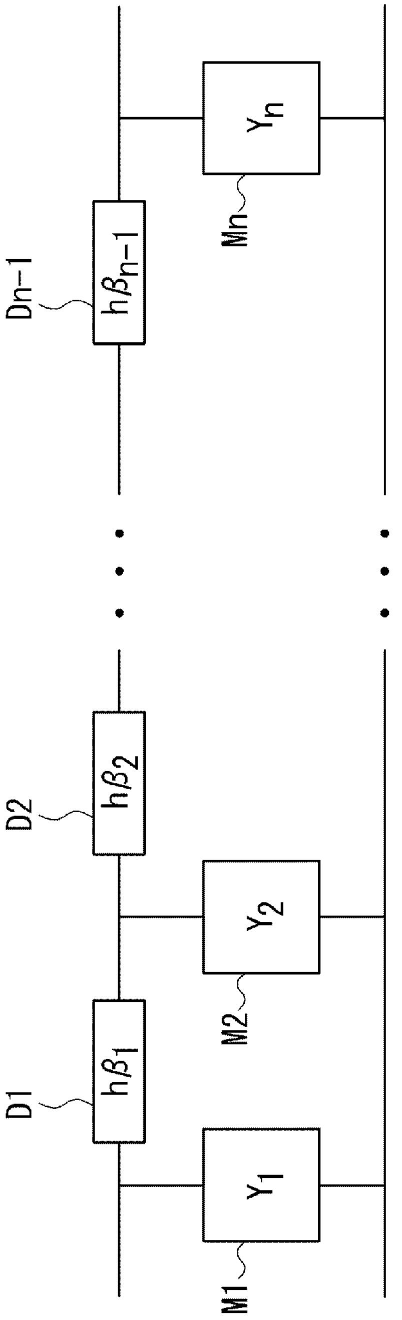
FIG. 6 schematically illustrates an equivalent circuit of the cube basic structure including n metal layers and (n−1) dielectric layers alternately stacked in the Z-direction.

FIG. 6 schematically illustrates an equivalent circuit of the cube basic structure including n metal layers and (n−1) dielectric layers alternately stacked in the Z-axis direction. In FIG. 6, $Y_j$ is admittance of a j-th metal layer, $\beta_k$ is a phase constant of a k-th dielectric layer Dk, and h is a thickness of the dielectric layer, where j is an integer equal to or less than n and k is an integer equal to or less than n−1.

An ABCD-matrix of the cube unit can be calculated using the equivalent circuit illustrated in FIG. 6. The ABCD-matrix can be expressed by the expression illustrated in FIG. 7, where $\eta_1$ to $\eta_{n-1}$ are wave impedances of dielectric layers D1 to Dn−1 and is wave impedance of an external environment, for example, air.

Thus, the ABCD-matrix of the cube unit including n metal layers can be calculated and be transformed into S-parameters as expressed by the following expression.

Therefore, transmittance and a phase of transmission coefficient of the present configuration can be derived. Based on these expressions, it is possible to calculate desired admittance of each metal layer which is determined by the metal patterns.

Thus, it is possible to achieve an arbitrary phase shift of the electromagnetic wave passing through the cube unit by achieving desired admittance determined by the metal patterns in the passive metal layers or by the metal patterns and the active components in the active metal layers. Further, no power can be theoretically reflected by designing the cube unit to have the same impedance as the external environment, for example, air.

Figure 8:
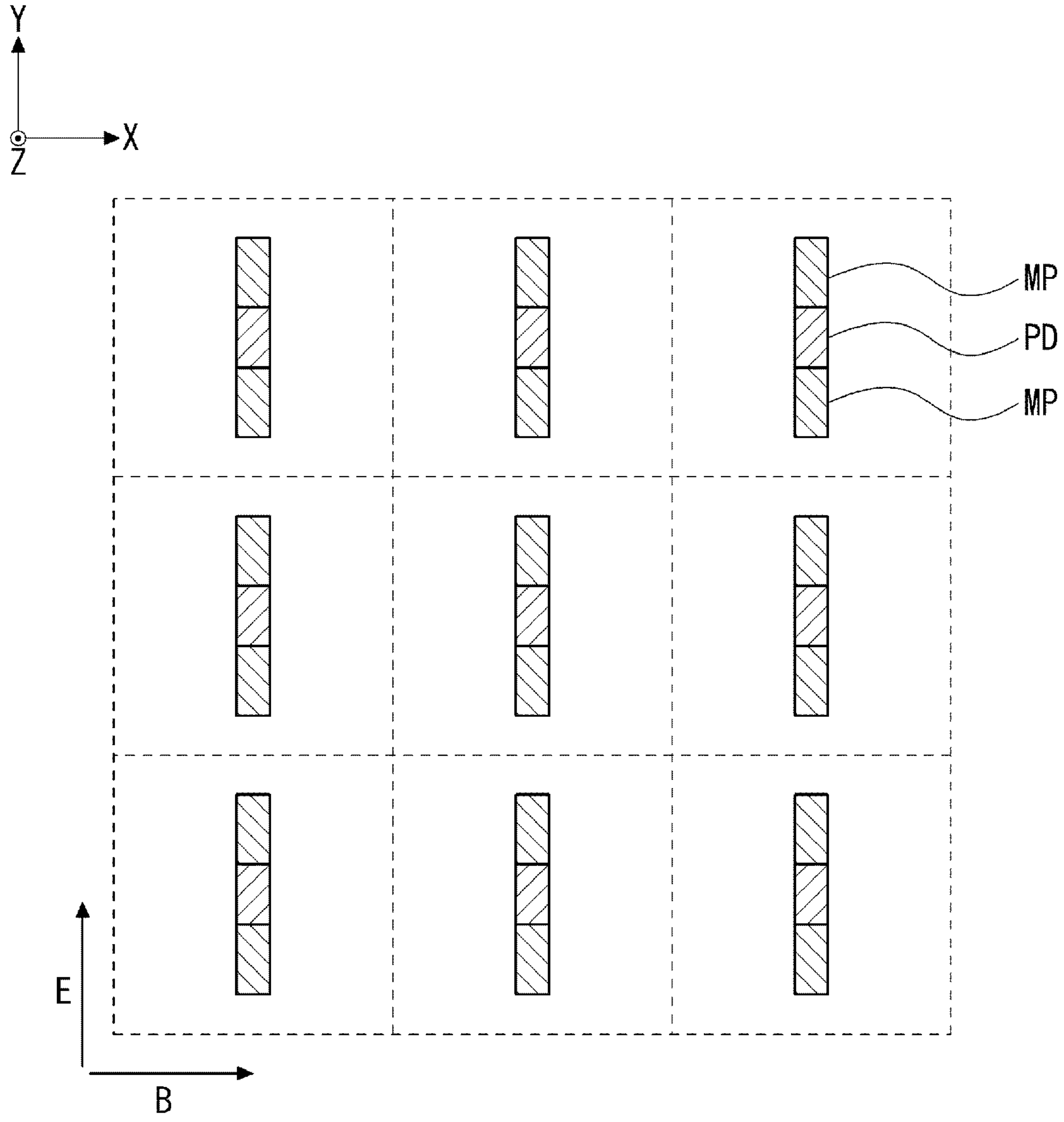
FIG. 8 schematically illustrates an example of the active metal layer included in the cube units.

FIG. 8 schematically illustrates an example of the active metal layer included in the cube units. As illustrated in FIG. 8, the active metal layer includes two metal pads MP and a PIN diode PD. When a magnetic field B appears in the X-axis direction and an electric field E appears along the Y-axis direction, the metal pads MP are equivalent to inductors and gaps between metal parts separated from each other can be equivalent to capacitors. Further, the metal pads MP are connected to the control circuit 20, so that the state of the PIN diode PD can be determined by the control circuit 20. When the PIN diode PD is forward-biased by the control circuit, the PIN diode PD is equivalent to a series circuit of an on-resistor and an inductor. When the PIN diode PD is reverse-biased by the control circuit, the PIN diode PD is equivalent to a parallel circuit of an off-resistor and a capacitor. Thus, the control circuit 20 can adjust the admittance of the active metal layer to a desired value.

Figure 9:
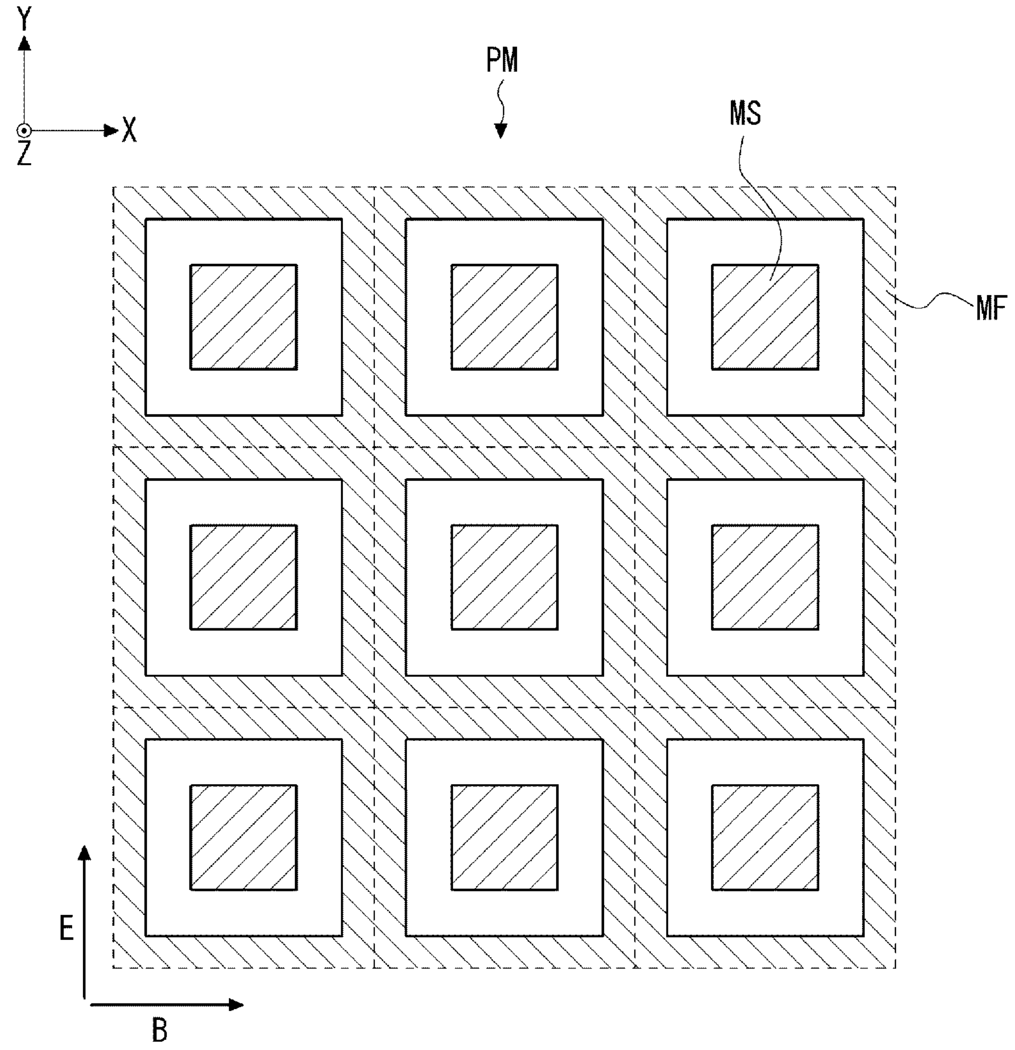
FIG. 9 schematically illustrates an example of one passive metal layer included in the cube units.

FIG. 9 schematically illustrates an example of one passive metal layer included in the cube units. As illustrated in FIG. 9, the passive metal layer includes a metal frame MF and a metal square MS. The metal frame MF is configured as a metal closed-loop along a perimeter of the shape of the metal layer. The metal square MS is placed in an area surrounded by the metal frame MF to be insulated from the metal frame MF. Note that widths of the metal frames MF and sizes of the metal squares MS of the metal layers disposed in cube units 1 and 2 may be different from each other or the same. In this configuration, the combination of the metal frame MF and the metal square MS can be regarded as a combination of inductors L and capacitors C. Here, it should be appreciated that, when metal patterns included in adjacent two cube units are formed on the same plane, the metal patterns may be continuously formed across the border. When a magnetic field B occurs in an X-axis direction and an electric field E appears along a Y-axis direction, metal parts in a ring shape are equivalent to inductors and gaps between metal parts separated from each other can be equivalent to capacitors. Accordingly, by designing the metal frame MF and the metal square MS, inductance and capacitance can be adjusted.

Figure 10:
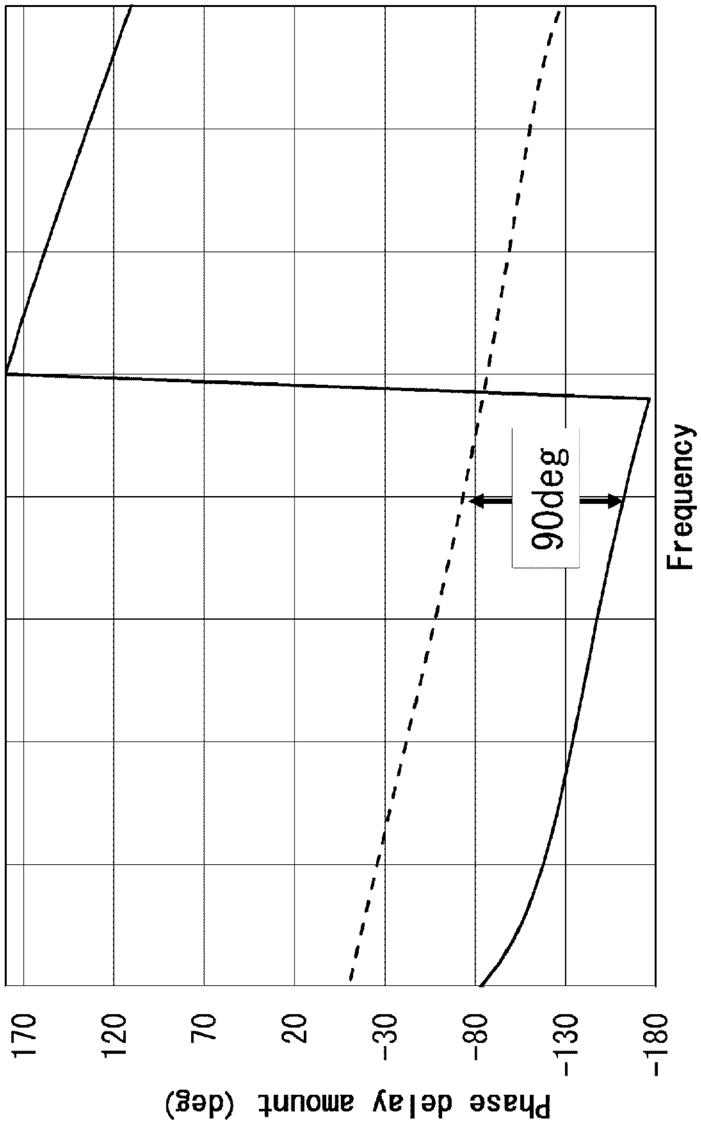
FIG. 10 illustrates simulation results of the cube units having the configuration illustrated in FIGS. 8 and 9.

FIG. 10 illustrates simulation results of the cube units having the configurations illustrated in FIGS. 8 and 9. Phase delay amount indicates the phase difference of electromagnetic wave transmitting through the cube unit having the configurations illustrated in FIGS. 8 and 9. The solid line illustrates the phase delay amount of the cube unit at a frequency range in an ON state, which means the PIN diodes PD on the active metal layers AM are forward-biased by the control circuit 20. The dotted line illustrates the phase delay amount of the cube unit at a frequency range in an OFF state, which means the PIN diodes PD on the active metal layers AM are reverse-biased by the control circuit 20. It is illustrated in FIG. 10 that the phase delay amount difference between the solid line and the dotted line is 90 degrees in the frequency range. That is to say, the cube unit operates in either of the two states decided by the control circuit 20. Thus, the phase delay amount difference of 90 degrees can be provided by the state of the cube unit between the above-described two states. As a result, it is possible to achieve the phase delay amount difference of 90 degrees with high efficiency by appropriately design the active metal layers and passive metal layers illustrated FIGS. 8 and 9.

Therefore, as described above, the serially arranged cube units can cover the all of the phase shift range from 0 to 360 degrees by appropriately switching the state of each cube unit among the three states by the control circuit. As described above, according to the present configuration, it is possible to realize the phase control device capable of achieving the arbitrary phase shift with high efficiency by serially arranged cube units to double the phase delay amount range.

Figure 11:
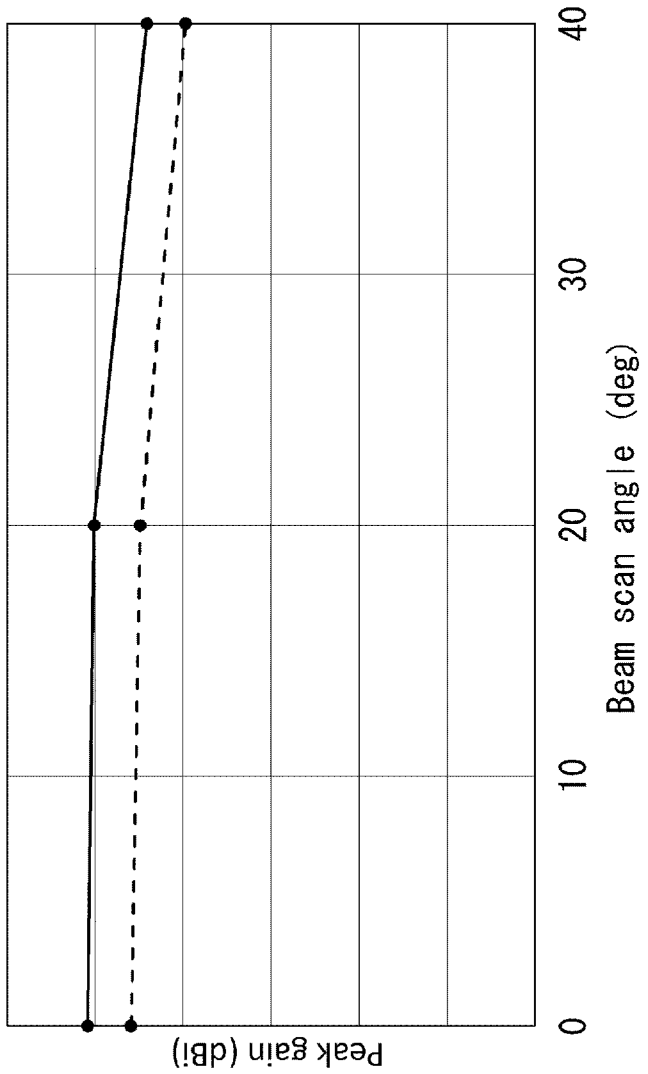
FIG. 11 illustrates angular dependency of gains of the antenna system according to the first exemplary embodiment and a comparative antenna system.

FIG. 11 schematically illustrates angular dependency of gains of the antenna system according to the first exemplary embodiment and a comparative antenna system. In FIG. 11, the longitudinal axis represents a beam scan angle with respect to the Z-axis direction. The solid line indicates the gain of the antenna system including the phase control device 100 according to the first exemplary embodiment. The dotted line indicates the gain of the comparative antenna system including a comparative phase control device. The comparative phase control device includes a phase control lens that includes only single metamaterial board. In the comparative antenna system, the single metamaterial board can be in the first state or the second state so that the control circuit 20 can switch the state of the phase control lens into one of two states. In this case, the phase delay amount difference between the two states is 180 degrees. Therefore, as illustrated in FIG. 11, the gain of the present configuration is higher than that of the comparative antenna system in a wide angular range.

As illustrated in FIGS. 2 and 3, a reference point located at a center of each cube unit in the X-Y plane is indicated by RP. Note that, for simplification, the reference point RP of only one cube unit of each metamaterial board is illustrated in FIG. 3. In this case, as described above, as the distance L from the center point CP to the reference point RP (illustrated in FIG. 2) increases, the phase of the electromagnetic wave reaching the cube unit from the antenna 101 delays. The control circuit 20 determines the phase delay amount of each cube unit one by one. Therefore, the phase control lens 10 in the phase control device 100 is configured in such a manner that the phase delay amount of the cube unit decreases as the distance L from the center point CP to the reference point RP increases in order to uniform the phase of the electromagnetic wave emitted from the surface of the phase control unit 100 not facing the antenna 101. In other words, the phase control device 100 can focus the electromagnetic wave emitted from the antenna 101 like a convex lens, and the radiation pattern of the main beam is perpendicular to the X-Y plane.

Figure 12:
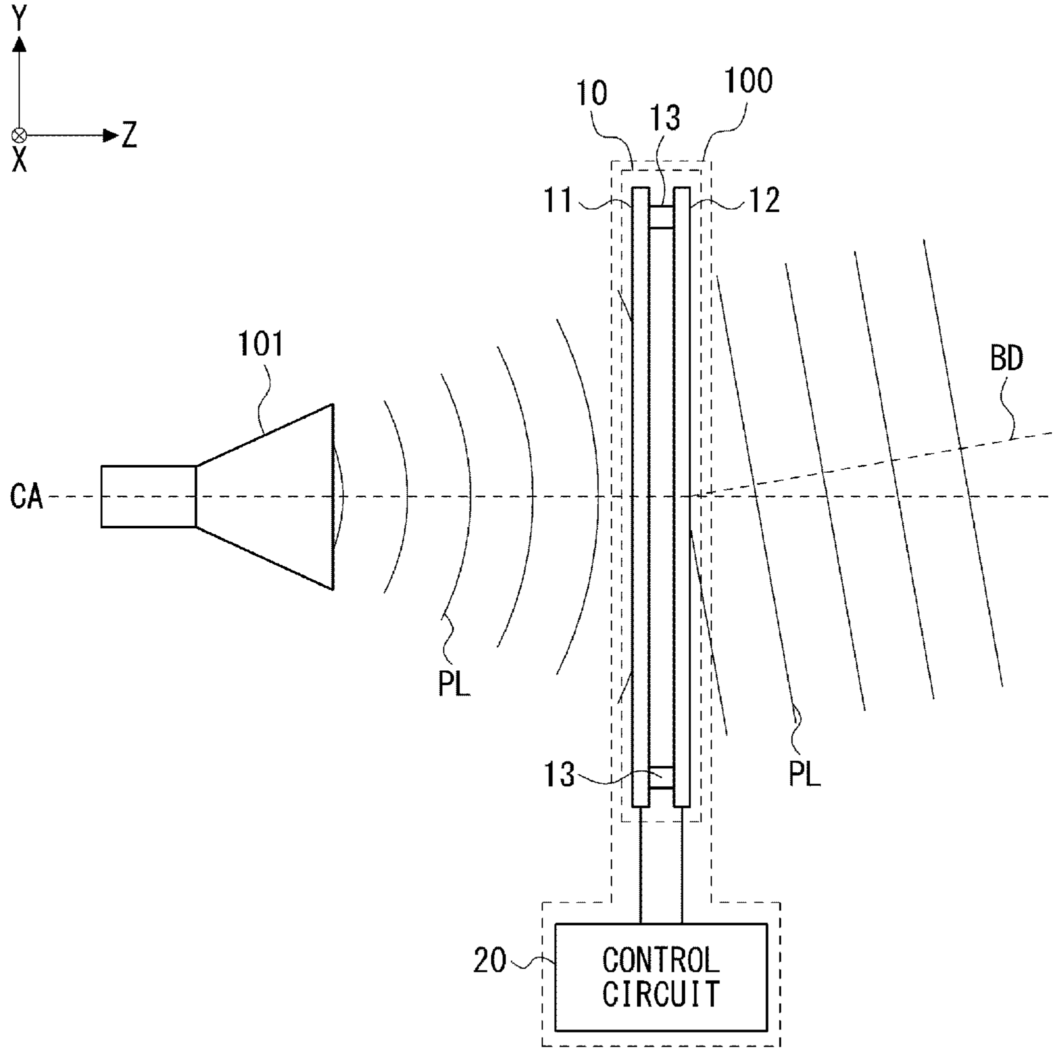
FIG. 12 schematically illustrates a radiation pattern of a main beam tilted from the Z-direction.

Note that the phase of the emitted electromagnetic wave after the phase control device 100 illustrated in FIG. 1 is merely an example. FIG. 12 schematically illustrates a radiation pattern of the main beam tilted from the Z-axis direction. As illustrated in FIG. 12, the phase delay amount of each cube unit can be controlled in such a manner that the radiation pattern of the main beam is tilted from the Z-axis direction to a specified direction BD. Therefore, the phase control device 100 can dynamically sweep the radiation pattern of the main beam over a wide range by switching the equivalent states to cause each cube unit to provide the electromagnetic wave with an appropriate phase delay amount.

Note that the phase control described above with reference to FIG. 1 is merely an example. The phase control device may be configured in such a manner that a phase delay amount of the cube unit determined by the control circuit 20 increases as the distance L from the center point CP to the reference point RP increases. In this case, the phase control device may be configured to diffuse the electromagnetic wave like a concave lens according to usage of the electromagnetic wave by appropriately designing the cube units serving as the three-dimensional units.

Further, the transmission direction of the electromagnetic wave emitted from the antenna and reaching the phase control device is not limited to the direction (the Z-axis direction) perpendicular to the surface (the X-Y plane) of the phase control device. The transmission direction of the electromagnetic wave emitted from the antenna and reaching the phase control device may be tilted with respect to the direction (the Z-axis direction) perpendicular to the surface (the X-Y plane) of the phase control device. Additionally, the transmission direction of the electromagnetic wave emitted from the phase control device is not limited to the direction (the Z-axis direction) perpendicular to the surface (the X-Y plane) of the phase control device. The transmission direction of the electromagnetic wave emitted from the phase control device may be tilted with respect to the direction (the Z-axis direction) perpendicular to the surface (the X-Y plane) of the phase control device by appropriately designing the cube units serving as the three-dimensional units.

Other Embodiment

Note that the present invention is not limited to the above exemplary embodiments and can be modified as appropriate without departing from the scope of the invention. For example, the shapes of the three-dimensional units arranged in the phase control device are not limited to one shape. Thus, as long as the three-dimensional units can be densely arranged without any spaces and desired phase control can be achieved, various shapes such as the hexagonal column and the triangular column described above, a cube, and a cuboid can be combined to constitute the array of the three-dimensional units.

The metal layer may be formed by any metal and the dielectric layer may be formed by any dielectric material.

In the exemplary embodiment described above, two metamaterial boards have been cascaded in a phase control lens.

However, it is merely an example. Therefore, three or more structures can be combined to constitute the phase control lens assembly.

In the exemplary embodiment described above, the phase control device has been configured as a board-like shape device. However, the shape of the phase control device is not limited to this. For example, the phase control device may be configured as a disk-like shape device other than the board-like shape device.

While the present invention has been described above with reference to exemplary embodiments, the present invention is not limited to the above exemplary embodiments. The configuration and details of the present invention can be modified in various ways which can be understood by those skilled in the art within the scope of the invention.

REFERENCE SIGNS LIST

AM ACTIVE METAL LAYER
CA CENTRAL AXIS
CP CENTER POINT
RP REFERENCE POINT
D1 TO DN−1 DIELECTRIC LAYERS
M, M1 TO MN METAL LAYERS
MF METAL FRAME
MS SQUARE METAL
PA CUBE UNIT PAIR
PM PASSIVE METAL LAYERS
1, 2 CUBE UNITS
10 PHASE CONTROL LENS
11, 12 METAMATERIAL BOARDS
13 AIR SPACER
20 CONTROL CIRCUIT
100 PHASE CONTROL DEVICES
101 ANTENNA

What is claimed is:

1. A phase control device comprising:
a phase control lens including at least two metamaterial boards arranged in a first direction and separated from each other, each metamaterial board shifting a phase of electromagnetic wave passing therethrough; and
a control circuit configured to control admittance distribution in a plane perpendicular to the first direction of each metamaterial board, wherein
a principal surface of each metamaterial board is perpendicular to the first direction,
the metamaterial board comprises a two-dimensional array of three-dimensional units that are two-dimensionally arranged in a plane parallel to the principal surface and is configured to shift the phase of electromagnetic wave passing therethrough,
the control circuit controls each three-dimensional unit to adjust a phase delay amount of each three-dimensional unit provided to the electromagnetic wave,
each three-dimensional unit is configured in such a manner that a state of that can be switched to control the phase delay amount of each three-dimensional unit,
the control circuit switches the state of each three-dimensional unit, and
when the state of each three-dimensional unit is changed, the phase delay amount of each three-dimensional unit provided to the electromagnetic wave is changed.

2. The phase control device according to claim 1, wherein each three-dimensional unit comprises:
two active metal layers stacked in the first direction, each active metal layer comprising at least one active component;
at least one passive metal layer stacked with the two active metal layers in the first direction to be interposed between the two active metal layers; and
a plurality of dielectric layers stacked in the first direction with the two active metal layers and the at least one passive metal layer, each dielectric layer being interposed between the active metal layer and the passive metal layer adjacent to each other or between the passive metal layers adjacent to each other, and
the control circuit controls at least one active component in one three-dimensional unit to switch the state of the three-dimensional unit.

3. The phase control device according to claim 1, wherein
a set of three-dimensional units respectively disposed in the at least two metamaterial boards and arranged in the first direction can provide the electromagnetic wave passing therethrough with a full range phase delay,
each three-dimensional unit in the set of three-dimensional units can provide the electromagnetic wave passing therethrough with a part of the full range phase delay, and
a sum of the phase delays provided by the three-dimensional units of in the set of three-dimensional units are provided to the electromagnetic wave passing therethrough.

4. The phase control device according to claim 1, wherein a transmission direction of the electromagnetic wave emitted from the two-dimensional array after the phase of the electromagnetic wave has been shifted is the first direction or a direction tilted with respect to the first direction.

5. An antenna system comprising:
an antenna configured to emit electromagnetic wave; and
a phase control device configured to control a phase of the electromagnetic wave, wherein
the phase control device comprises:
a phase control lens including at least two metamaterial boards arranged in a first direction and separated from each other, each metamaterial board shifting a phase of electromagnetic wave passing therethrough; and
a control circuit configured to control admittance distribution in a plane perpendicular to the first direction of each metamaterial board, wherein
a principal surface of each metamaterial board is perpendicular to the first direction,
the metamaterial board comprises a two-dimensional array of three-dimensional units that are two-dimensionally arranged in a plane parallel to the principal surface and is configured to shift the phase of electromagnetic wave passing therethrough,
the control circuit controls each three-dimensional unit to adjust a phase delay amount of each three-dimensional unit provided to the electromagnetic wave,
each three-dimensional unit is configured in such a manner that a state of that can be switched to control the phase delay amount of each three-dimensional unit,
the control circuit switches the state of each three-dimensional unit, and
when the state of each three-dimensional unit is changed, the phase delay amount of each three-dimensional unit provided to the electromagnetic wave is changed.

6. A method of controlling a phase of electromagnetic wave comprising:
emitting electromagnetic wave to a phase control lens, the phase control lens including at least two metamaterial boards arranged in a first direction and separated from each other, each metamaterial board shifting a phase of electromagnetic wave passing therethrough; and controlling admittance distribution in a plane perpendicular to the first direction of each metamaterial board, wherein a principal surface of each metamaterial board is perpendicular to the first direction, the metamaterial board comprises a two-dimensional array of three-dimensional units that are two-dimensionally arranged in a plane parallel to the principal surface and is configured to shift the phase of electromagnetic wave passing therethrough, each three-dimensional unit is controlled to adjust a phase delay amount of each three-dimensional unit provided to the electromagnetic wave, each three-dimensional unit is configured in such a manner that a state of that can be switched to control the phase delay amount of each three-dimensional unit, when the state of each three-dimensional unit is changed, the phase delay amount of each three-dimensional unit provided to the electromagnetic wave is changed.

* * * * *